(12) United States Patent
Liu et al.

(10) Patent No.: US 11,084,759 B2
(45) Date of Patent: Aug. 10, 2021

(54) LOW-SHRINKAGE, HIGH-STRENGTH, AND LARGE CERAMIC PLATE AND MANUFACTURING METHOD THEREOF

(71) Applicant: MONALISA GROUP CO., LTD., Foshan (CN)

(72) Inventors: Yijun Liu, Foshan (CN); Qinggang Wang, Foshan (CN); Limin Pan, Foshan (CN); Xiaofeng Yang, Foshan (CN); Zhijun Xie, Foshan (CN); Songzhu Zhang, Foshan (CN); Zhenhua Yan, Foshan (CN); Junle Dong, Foshan (CN); Yong Zhao, Foshan (CN); Yuandong Yang, Foshan (CN)

(73) Assignee: MONALISA GROUP CO., LTD., Foshan (CN)

( * ) Notice: Subject to any disclaimer, the term of this patent is extended or adjusted under 35 U.S.C. 154(b) by 400 days.

(21) Appl. No.: 16/075,075

(22) PCT Filed: Apr. 14, 2016

(86) PCT No.: PCT/CN2016/079299
§ 371 (c)(1),
(2) Date: Aug. 2, 2018

(87) PCT Pub. No.: WO2017/133080
PCT Pub. Date: Aug. 10, 2017

(65) Prior Publication Data
US 2020/0361823 A1   Nov. 19, 2020

(30) Foreign Application Priority Data
Feb. 3, 2016 (CN) .......................... 201610078095.8

(51) Int. Cl.
*C04B 33/22* (2006.01)
*C04B 33/16* (2006.01)
(Continued)

(52) U.S. Cl.
CPC ............ *C04B 33/22* (2013.01); *C04B 33/131* (2013.01); *C04B 33/16* (2013.01); *C04B 33/20* (2013.01);
(Continued)

(58) Field of Classification Search
None
See application file for complete search history.

(56) References Cited

U.S. PATENT DOCUMENTS

| 4,613,627 A | 9/1986 | Sherman et al. |
| 4,806,206 A * | 2/1989 | Kamijo ................. C04B 35/622 162/145 |

FOREIGN PATENT DOCUMENTS

| CN | 1191853 A | 9/1998 |
| CN | 101555121 A | 10/2009 |

(Continued)

OTHER PUBLICATIONS

Li, "Application of Silane Coupling Agent in Surface Modification of Silicate Mineral Power," Non-Metallic Mines, vol. 30, Sep. 15, 2007, 4 pages.
(Continued)

*Primary Examiner* — Jeffrey D Washville
(74) *Attorney, Agent, or Firm* — Alleman Hall Creasman & Tuttle LLP

(57) ABSTRACT

Disclosed are a low-shrinkage, high-strength, and large ceramic plate and a manufacturing method thereof. The method comprises the following steps: (1) preparing a ceramic raw material powder; (2) subjecting an acicular wollastonite to surface coating with a silane coupling agent
(Continued)

and to pre-dispersion with a fumed silica to obtain a pre-treated acicular wollastonite; and (3) thoroughly mixing the ceramic raw material powder and the pre-treated acicular wollastonite and granulating the resulting mixture, the amount of the pre-treated acicular wollastonite added being 10 wt % to 30 wt % of the ceramic raw material powder, and subjecting the resulting granules to dry pressing and sintering to obtain the large ceramic plate. The acicular wollastonite is incorporated into the manufacturing of the large ceramic plate to take full advantage of the reinforcing effect and low sintering shrinkage characteristics of the acicular wollastonite. The invention reduces sintering shrinkage and increases product strength.

7 Claims, 1 Drawing Sheet

(51) Int. Cl.
*C04B 33/20* (2006.01)
*C04B 35/34* (2006.01)
*C04B 35/65* (2006.01)
*C04B 33/13* (2006.01)

(52) U.S. Cl.
CPC .............................. *C04B 2235/349* (2013.01); *C04B 2235/3418* (2013.01); *C04B 2235/3454* (2013.01); *C04B 2235/656* (2013.01)

(56) References Cited

FOREIGN PATENT DOCUMENTS

| CN | 101608106 A | 12/2009 |
|---|---|---|
| CN | 101774594 A | 7/2010 |
| CN | 102173760 A | 9/2011 |
| CN | 102329562 A | 1/2012 |
| CN | 104513055 A | 4/2015 |
| CN | 104693684 A | 6/2015 |
| CN | 104743881 A | 7/2015 |

OTHER PUBLICATIONS

ISA State Intellectual Property Office of the People's Republic of China, International Search Report Issued in Application No. PCT/CN2016/079299, dated Oct. 26, 2016, WIPO, 4 pages.

* cited by examiner

TABLE 1 CHEMICAL COMPOSITIONS OF CERAMIC RAW MATERIAL USED

|  | $SiO_2$ | $Al_2O_3$ | $Fe_2O_3$ | $TiO_2$ | CaO | MgO | $K_2O$ | $Na_2O$ | IGNITION LOSS |
|---|---|---|---|---|---|---|---|---|---|
| WASHED MUD | 61.81 | 25.32 | 0.61 | 0.32 | 0.52 | 0.22 | 0.66 | 0.51 | 9.97 |
| MIXED MUD | 64.89 | 22.08 | 0.68 | 0.32 | 0.55 | 0.28 | 0.54 | 0.52 | 10.34 |
| POTASSIUM SAND | 60.01 | 25.91 | 0.49 | 0.21 | 0.44 | 0.04 | 6.22 | 0.81 | 6.52 |
| MEDIUM TEMPERATURE SAND | 72.39 | 16.59 | 0.26 | 0.07 | 1.04 | 0.09 | 2.78 | 3.88 | 2.85 |
| SODIUM SAND #1 | 71.73 | 17.07 | 0.26 | 0.05 | 0.61 | 0.08 | 0.93 | 8.29 | 0.94 |
| SODIUM SAND #2 | 70.18 | 17.34 | 0.2 | 0.07 | 0.97 | 0.03 | 0.37 | 9.36 | 1.35 |
| BLACK TALC | 58.38 | 1.13 | 0.21 | / | 2.42 | 27.88 | 0.05 | / | 9.77 |

LOW-SHRINKAGE, HIGH-STRENGTH, AND LARGE CERAMIC PLATE AND MANUFACTURING METHOD THEREOF

FIELD OF THE INVENTION

The present invention relates to a preparation process of a ceramic plate, in particular to a low-shrinkage, high-strength, and large-size ceramic plate and a preparation method thereof.

BACKGROUND OF THE INVENTION

Because ceramic plates greatly save raw materials, energy, and transportation costs, as well as save space and reduce the bearing load of building structures, they are particularly in line with the Chinese national energy-saving environmental protection green industry policy. At present, there are two methods, dry pressing and wet extrusion molding, for industrial production of large-size ceramic plates. The extrusion molding process requires a high moisture content of the a billet, and pores and cracks tend to be generated in the a green body during the drying process, which will reduce the quality of the as-fired product and the yield. In contrast, the dry pressing process is more mature and can give higher quality products with a higher yield.

In order to further increase the strength and toughness of the ceramic plate, high aspect ratio fibers can be added. For example, CN1191853A discloses a method for manufacturing a large-size flat-plate-like ceramic sintered body, wherein acicular wollastonite and water are added to a ceramic raw material, and the resulting mixture is extruded into a cylindrical shape by a vacuum kneader and then subjected to calendering to obtain a large-size plate-like ceramic sintered body having high strength. Due to the wet extrusion process, acicular wollastonite is easily oriented along the direction of extrusion, resulting in anisotropy in the strength of the product, that is, a high strength along the direction perpendicular to the extrusion direction, and a low strength along the direction parallel to the extrusion direction.

Dry pressing requires preparation of a powder. Limited by the equipment, fibers having a certain aspect ratio cannot be sprayed out in a wet spray granulation process for preparation of the powder. For example, CN102173760A discloses a method for manufacturing a large silicon oxide ceramic sheet, wherein the raw material is mixed with acicular wollastonite, and granulated by spraying and drying, for preparation of green body particles. However, the acicular wollastonite has a great influence on the flow rate of the slurry, making it difficult to spray the powder, and the long aspect ratio makes it difficult to screen and de-iron, which has a great influence on the whiteness of the green body. Therefore, for ceramics containing fibers having a certain aspect ratio, it is preferable to use a dry process for preparing the powder. However, it is difficult to uniformly disperse the fibers using the dry process for preparing the powder. Meanwhile, the existing ceramic plate formulations have some shortcomings such as large firing shrinkage (about 10%), which easily leads to an irregular size.

SUMMARY OF THE INVENTION

In view of the above, the technical problem to be solved by the present invention is to provide a low-shrinkage, high-strength, and large-size ceramic plate and a preparation method thereof. The resulting ceramic plate has a high strength, a good toughness, and a small firing shrinkage.

In one aspect, provided is a method for manufacturing a low-shrinkage, high-strength, and large-size ceramic plate, the method comprising the steps of:

(1) preparing a ceramic raw material powder;

(2) subjecting an acicular wollastonite to surface coating with a silane coupling agent and to pre-dispersion with a fumed silica to obtain a pre-treated acicular wollastonite; and (3) thoroughly mixing the ceramic raw material powder and the pre-treated acicular wollastonite and granulating the resulting mixture, the amount of the pre-treated acicular wollastonite added being 10 wt % to 30 wt % of the ceramic raw material powder, and subjecting the resulting granules to dry pressing and sintering to obtain the low-shrinkage, high-strength, and large-size ceramic plate.

This invention makes full use of the reinforcing effect and small firing shrinkage characteristics of acicular wollastonite, and introduces the acicular wollastonite in the manufacture of large-size ceramic plates, thereby increasing the strength of the large-size ceramic plate and reducing the firing shrinkage of the large-size ceramic plate, to produce a low-shrinkage, high-strength, and large-size ceramic plate. Meanwhile, the use of dry pressing technology can improve product quality and yield. Moreover, the acicular wollastonite is pretreated, specifically, is subjected to surface modification with a silane coupling agent and to pre-dispersion with a fumed silica, wherein the surface modification solves the problems of agglomeration and poor dispersibility of the powder, and the loose structure of the fumed silica can further improve the dispersibility of the powder, thereby solving the dispersion problem of the acicular wollastonite, and further improving product quality and yield.

Preferably, in step (1), the formula of the ceramic raw material is: 8% to 20% of washed mud, 4% to 16% of mixed mud, 12% to 20% of potassium sand, 24% to 30% of medium temperature sand, 6% to 12% of sodium sand #1, 16% to 22% of sodium sand #2, and 1% to 2% of black talc.

Preferably, in step (1), the method for preparing the ceramic raw material powder comprises: subjecting each ceramic raw material to drying, pre-pulverizing, and sieving through a 120-mesh sieve; mixing the sieved raw materials according to the formula; and powdering the resulting mixture, the powder being controlled to pass through a 250-mesh sieve with sieve residues of less than 2.0%. According to this invention, a dry granulation process is employed for granulation, thereby the granules can be better mixed with the acicular wollastonite.

Preferably, the aspect ratio of the acicular wollastonite is 10 to 18. The use of acicular wollastonite having an aspect ratio of 10 to 18 not only facilitates the dispersion of acicular wollastonite but also enhances the strength of the ceramic plate.

Preferably, step (2) comprises: spraying a silane coupling agent (with an additive amount of 0.1 to 0.8%) on an acicular wollastonite in a surface modification apparatus to form a modifier coating thereon to reduce agglomeration; and thoroughly mixing the coated acicular wollastonite and a fumed silica (with an additive amount of 0.1 to 0.5%) for pre-dispersion treatment.

Preferably, the silane coupling agent is at least one of KH550, KH560, and KH570.

Preferably, in step (3), granulating the resulting mixture is performed by a dry granulation process. A powder containing an acicular wollastonite can be easily produced by the dry granulation process, without limitation on the equipment used.

Preferably, in step (3), the pressure of the dry pressing is 86000 to 96000 kN, and the molding specification is (1150 to 1300) mm*(2400 to 2600) mm*(3 to 6) mm. According to this invention, a large-size ceramic body can be produced.

Preferably, the firing temperature is 1190 to 1220° C.

In another aspect, provided is a low-shrinkage, high-strength, and large-size ceramic plate manufactured by any one of the methods described above, the ceramic plate having a size of (1100 to 1260) mm*(2200 to 2500) mm*(3 to 6) mm. The ceramic plate includes a porcelain product and a vitrified tile product, wherein the porcelain product has a shrinkage of 5 to 8%, a bending strength of 55 to 68 MPa (preferably 58 to 68 MPa), and a water absorption of less than 0.5%, and the vitrified tile product has a shrinkage of 1 to 5%, a bending strength of 40 to 55 MPa, and a water absorption of 0.5 to 10%.

According to the present invention, a large-size ceramic plate having a high strength, a good toughness, and a low firing shrinkage can be provided. It can not only improve the firing regularity of the product, but also reduce consumables, and further save energy and reduce consumption.

DETAILED DESCRIPTION OF THE EMBODIMENTS

Figures 1, 2:
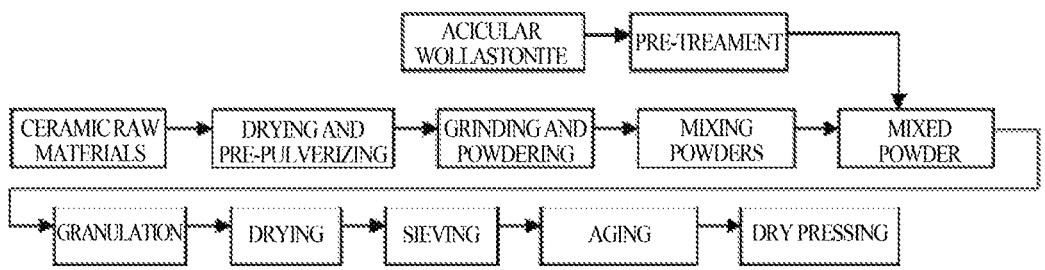
FIG. 1 shows a process flow diagram of one embodiment of the present invention.
FIG. 2 shows a ceramic raw material chemical composition table (Table 1) of one example of the present invention.

The present invention will be further described with the following embodiments below with reference to the drawings. It should be understood that the drawings and the following embodiments are only used for explaining this invention, and do not limit this invention. Unless otherwise specified, the content (additive amount) percentages described herein are all mass percentages.

In the present invention, a low-shrinkage, high-strength, and large-size ceramic plate is prepared by a dry pressing process. Compared with wet extrusion molding, the dry pressing process is more mature, and the product quality and yield are higher. In the invention, acicular wollastonite is added into the raw material of the ceramic plate to further increase the strength and toughness of the ceramic plate, as well as reduce the firing shrinkage, and improve size regularity. In addition, before being added, the acicular wollastonite is pre-treated to solve the dispersion problem of acicular wollastonite. FIG. 1 shows a process flow diagram of one embodiment of the present invention. Hereinafter, a method for preparing a low-shrinkage, high-strength, and large-size ceramic plate according to the present invention will be described with reference to FIG. 1.

Preparation of Ceramic Raw Material Powder

Ceramic raw material: in the present invention, the ceramic raw material is not particularly limited, and common ceramic raw materials can be used. In one example, the raw materials used and their chemical composition are shown in Table 1.

Preferably, the ceramic raw material formulation is as follows:

8% to 20% of washed mud, 4% to 16% of mixed mud, 12% to 20% of potassium sand, 24% to 30% of medium temperature sand, 6% to 12% of sodium sand #1, 16% to 22% of sodium sand #2, and 1% to 2% of black talc.

The ceramic raw materials used are dried. Preferably, they are dried to have a moisture of less than 4%. After having dried, each ceramic material is pre-pulverized using a pre-pulverizing apparatus and passed through a 120-mesh sieve. The oversized ceramic materials are powdered again, and the raw materials past the sieves are premixed according to the formula, and then subjected to a powdering process (grinding and powdering), the powder being controlled to pass through 250-mesh sieves with sieve residues of less than 2.0%. The powders are mixed to obtain a ceramic raw material powder.

Acicular Wollastonite

In the present invention, the aspect ratio of the acicular wollastonite is preferably 10 to 18. If the aspect ratio is greater than 18, the acicular wollastonite will be difficult to disperse; if the aspect ratio is less than 10, the enhancement effect will be affected. The acicular wollastonite may have a diameter of 10 μm to 60 μm.

Pre-Treatment of Acicular Wollastonite

In the present invention, the acicular wollastonite may be subjected to the following pre-treatment: surface coating with a silane coupling agent and pre-dispersion with a fumed silica. The silane coupling agent can modify the surface of the acicular wollastonite to enhance its compatibility with ceramic raw materials. The fumed silica can pre-disperse the acicular wollastonite. As a result, the dispersibility of the acicular wollastonite can be significantly improved, so that the acicular wollastonite can be uniformly dispersed in the ceramic raw material. Silane coupling agents include but are not limited to KH550, KH560, and KH570, preferably KH550. In one example, the pre-treatment is performed as follows. An acicular wollastonite is sprayed with a silane coupling agent (with an additive amount of 0.1 to 0.8%) in a surface modification apparatus so that a modifier coating layer is formed thereon, and then thoroughly mixed with a fumed silica (with an additive amount of 0.1 to 0.5%) for pre-dispersion treatment. The percentages of the additive amount here are relative to the acicular wollastonite.

The pre-treated acicular wollastonite is thoroughly mixed with the ceramic raw material powder to form a mixed powder. The mixing method may be, for example, ball milling. The amount of acicular wollastonite added is preferably 10% to 30%. If the addition amount is more than 30%, the firing temperature is low and the sintering range is small, which is not favorable for firing. If the addition amount is less than 10%, the shrinkage is relatively serious, the increase in size is slight, and the effect cannot be achieved. More preferably, the acicular wollastonite is added in an amount of 15% to 20%.

Then, the mixed powder is granulated. Since fibers having a certain aspect ratio cannot be sprayed out in a wet spray granulation process, dry granulation is preferred in the present invention. Moreover, since the acicular wollastonite has good dispersibility after pre-treatment, it is suitable for dry granulation. In one example, the granulation is performed by a dry suspension granulation process. Raw materials for ceramic wall and floor tiles include clay-type raw materials, quartz-type raw materials, and feldspar-type raw materials. The ceramic raw materials are mixed proportionally, and dry-milled to a fine powder with a particle size of D50=11.3 μm using a new disc mill. In terms of the physical and chemical principle of the powder surface, at this time, the fine powder particles themselves spontaneously agglomerate due to surface tension and intermolecular forces. In addition, 25% or so of clay-type raw materials in the raw materials make the agglomeration ability of the fine powders themselves further enhanced. When the fine powders enter the mixing straight cylinder of a suspension granulation equipment, they are evenly dispersed under the action of the wind, and fully contacts with and adheres to atomized droplets with a certain viscosity. The droplets or large particles of the fine powder act as a core, and the fine powders near the core are layered thereon so that larger solid particles are formed. At the same time, since the atomized droplets have a certain viscosity, they can bind more fine powder particles together, and thus the fine powder particles further agglomerate and form larger particles. The primary formed particles are small in particle size and low in strength, and enter a special cyclone cylinder. The materials entering the cyclone cylinder are frictionally rolled along the cylinder wall. Under the action of friction and impact forces between materials, the particles further agglomerate, and thus have a better sphericity and a higher strength accordingly, helping to maintain the spherical shape of the powder. The granulated granules may have a particle size of 0.1 to 1 mm.

The above granules are then subjected to dry pressing. Prior to dry pressing, the granules can be dried, sieved, aged (eg, 24 hours), etc., so as to be more suitable for dry pressing. The pressure of dry pressing may be 86000 kN to 96000 kN. The molding specification may be (1150 to 1300) mm×(2400 to 2600) mm×(3 to 6) mm.

Then, the molded green body is fired to obtain a ceramic plate. In one example, the firing temperature is 1190 to 1220° C. The firing duration can be 50 to 65 minutes. After firing, the ceramic plate may be glazed and decorated by printing, and subjected to glaze firing. Alternatively, the green body may be glazed and decorated by printing, and subjected to one-time firing. In addition, the green body may be dried before firing. For example, it can be dried at 180 to 210° C. for 25 to 35 minutes.

In the present invention, the finished product after firing is a large-size ceramic plate, and its specification may be (1100 to 1260) mm*(2200 to 2500) mm*(3 to 6) mm. After firing, the ceramic plate may be subjected to cutting and edging to obtain a final product. The present invention makes full use of the small firing shrinkage characteristics of acicular wollastonite, and the firing shrinkage of the porcelain product is 5 to 8%. Meanwhile, because of the reinforcing effect of acicular wollastonite, the bending strength of the ceramic plate of the present invention is as high as 58 to 68 MPa. And the water absorption thereof is less than 0.5%. The ceramic plate of the present invention may be a porcelain tile product or a vitrified tile product. The porcelain tile product has a shrinkage of 5 to 8%, a bending strength of 55 to 68 MPa, and a water absorption of less than 0.5%. The vitrified tile product has a shrinkage of 1 to 5%, a bending strength of 40 to 55 MPa, and a water absorption of 0.5 to 10%.

Hereinafter, the present invention will be better described with the following representative examples. It should be understood that the following examples are only used to explain this invention and do not limit the scope of this invention. Any non-essential improvements and modifications made by a person skilled in the art based on this invention are all protected under the scope of this invention. The specific parameters below are only exemplary, and a person skilled in the art can choose proper values within an appropriate range according to the description of this article, and are not restricted to the specific values cited below.

The testing methods used in the following examples are as follows.

Determination of the aspect ratio of acicular wollastonite: polarizing microscope.

Determination of firing shrinkage: before firing, two perpendicular straight lines are drawn at the center of the tile surface, and a 10 mm line segment is measured from the intersection of the straight lines by a vernier caliper; after firing, the length of the line segment is measured again to calculate the shrinkage.

Determination of bending strength: SKZ Digital Display Bending Strength Measurement Apparatus.

Determination of water absorption: The water absorption, apparent porosity, and bulk density of building sanitary ceramics can be determined by TXY Digital Display Ceramic Water Absorption Apparatus and a vacuum method (the vacuum degree being adjustable in a range of 0.095 MPa or higher; the vacuum duration being continuously adjustable in a range of 0~99 minutes and 59 seconds; the soaking time being continuously adjustable in a range of 0~99 hours and 59 minutes; the volume being φ400*450 mm; and the power being ~220 V).

EXAMPLE 1

Ceramic raw material formula: 15% of washed mud, 10% of mixed mud, 16% of potassium sand, 28% of medium temperature sand, 10% of sodium sand #1, 20% of sodium sand #2, and 1% of black talc. The chemical composition of each raw material is shown as Table 1.

The acicular wollastonite has an aspect ratio of 15, and a diameter of 30 micron, which is purchased from Jiangxi Aote Fine Powder Co., Ltd., the type being AT-acicular powder.

The steps are as follows.

1) The ceramic raw materials used are dried to have a moisture of less than 4%. After having dried, each ceramic material is pre-pulverized using a pre-pulverizing apparatus and passed through a 120-mesh sieve. The oversized ceramic materials are powdered again, and the raw materials under the sieves are premixed according to the formula, and then subjected to a powdering process, the powder size being controlled to pass through a 250-mesh sieve with sieve residues of less than 2.0%, to give a powder.

2) The acicular wollastonite is subjected to surface coating with a silane coupling agent and pre-dispersion with 0.4% of fumed silica. The specific steps are as follows: the acicular wollastonite is sprayed with a silane coupling agent (with an additive amount of 0.5%) in a surface modification apparatus so that a modifier coating layer is formed thereon, and the agglomeration is reduced, and then thoroughly mixed with a fumed silica (with an additive amount of 0.4%) for pre-dispersion treatment.

3) The powder obtained in step 1) is thoroughly mixed with the pre-treated acicular wollastonite obtained in step 2), the amount of the pre-treated acicular wollastonite added being 13%. The resulting mixture is subjected to granulation. The granulation process is a dry suspension granulation process.

4) After being aged for 24 hours, the granules are fed to a press for molding. The pressure is 90000 kN. The size of the molded green body is 1275 mm*2550 mm*5.9 mm.

5) The green body is fired at 1210° C. for 55 minutes to obtain a ceramic plate. The finished product has a size of 1180 mm*2359 mm*5.5 mm, a finished product shrinkage of 7.5%, a bending strength of 60 MPa, and a water absorption of 0.27%.

EXAMPLE 2

As compared with Example 1, the only difference is that the amount of pre-treated acicular wollastonite added is 22%. The final finished ceramic plate product has a size of 1204 mm*2407 mm*5.4 mm, a finished product shrinkage of 5.6%, a bending strength of 65 MPa, and a water absorption of 0.34%.

EXAMPLE 3

As compared with Example 1, the only difference is that the amount of pre-treated acicular wollastonite added is 28%. The final finished ceramic plate product has a size of 1210 mm*2420 mm*5.6 mm, a finished product shrinkage of 5.1%, a bending strength of 66 MPa, and a water absorption of 0.45%.

EXAMPLE 4

As compared with Example 1, the only difference is that the amount of pre-treated acicular wollastonite added is 11%. The final finished ceramic plate product (vitrified tile product) has a size of 1223 mm*2445 mm*5.5 mm, a finished product shrinkage of 4.1%, a bending strength of 42 MPa, and a water absorption of 9%.

EXAMPLE 5

As compared with Example 1, the only difference is that the amount of pre-treated acicular wollastonite added is 27%. The final finished ceramic plate product (vitrified tile product) has a size of 1250 mm*2499 mm*5.5 mm, a finished product shrinkage of 2%, a bending strength of 47 MPa, and a water absorption of 6%.

COMPARATIVE EXAMPLE 1

As compared with Example 1, no acicular wollastonite is added, and only the ceramic raw materials described above are used to prepare a ceramic plate. The final finished ceramic plate product has a size of 1141 mm*2282 mm*5.4 mm, a finished product shrinkage of 10.5%, a bending strength of 48 MPa, and a water absorption of 0.23%.

COMPARATIVE EXAMPLE 2

As compared with Example 1, an acicular wollastonite is added, but the acicular wollastonite is not pre-treated, and the rest of the process is the same as Example 1. As a result, the acicular wollastonite is very unevenly dispersed, and the temperature of the agglomerates is very high, causing the sintering degrees to be inconsistent locally, and the finished product to be easily broken at a weak part, and have poor physical and chemical properties. The final finished ceramic plate product has a size of 1173 mm*2346 mm*5.5 mm, a finished product shrinkage of 8%, a bending strength of 48 MPa, and a water absorption of 0.6%.

The invention claimed is:
1. A method for manufacturing a ceramic plate, the method comprising the steps of:
(1) preparing a ceramic raw material powder;
(2) subjecting an acicular wollastonite to surface coating with a silane coupling agent and to pre-dispersion with a fumed silica to obtain a pre-treated acicular wollastonite, an aspect ratio of the acicular wollastonite being 10 to 18; and
(3) thoroughly mixing the ceramic raw material powder and the pre-treated acicular wollastonite, and granulating the resulting mixture, the amount of the pre-treated acicular wollastonite added being 10 wt % to 30 wt % of the ceramic raw material powder, and subjecting the resulting granules to dry pressing and sintering to obtain the ceramic plate, wherein
in step (1), the ceramic raw material powder includes the following components: 8% to 20% of washed mud, 4% to 16% of mixed mud, 12% to 20% of potassium sand, 24% to 30% of medium temperature sand, 6% to 12% of sodium sand #1, 16% to 22% of sodium sand #2, and 1% to 2% of black talc,
sodium sand #1 includes 71.73% $SiO_2$, 17.07% $Al_2O_3$, 0.26% $Fe_2O_3$, 0.05% $TiO_2$, 0.61% CaO, 0.08% MgO, 0.93% $K_2O$, and 8.29% $Na_2O$, and
sodium sand #2 includes 70.18% $SiO_2$, 17.34% $Al_2O_3$, 0.2% $Fe_2O_3$, 0.07% $TiO_2$, 0.97% CaO, 0.03% MgO, 0.37% $K_2O$, and 9.36% $Na_2O$.

2. The method of claim 1, wherein in step (1), the method for preparing the ceramic raw material powder comprises:
subjecting each ceramic raw material to drying, pre-pulverizing, and sieving through a 120-mesh sieve;
mixing the sieved raw materials according to the formula; and
powdering the resulting mixture, the powder being controlled to pass through a 250-mesh sieve with sieve residues of less than 2.0%.

3. The method of claim 1,
wherein step (2) comprises:
spraying a silane coupling agent on an acicular wollastonite in a surface modification apparatus to form a modifier coating thereon; and
thoroughly mixing the coated acicular wollastonite and a fumed silica for pre-dispersion treatment, and
wherein the amount of the silane coupling agent added is 0.1 to 0.8 wt % of the acicular wollastonite, and the amount of the fumed silica added is 0.1 to 0.5 wt % of the acicular wollastonite.

4. The method of claim 1, wherein the silane coupling agent is at least one of γ-amino propyl triethoxy silane, γ-glycidyloxy propyl trimethoxy silane, and γ-methacryloxy propyl trimethoxyl silane.

5. The method of claim 1, wherein in step (3), granulating the resulting mixture is performed by a dry granulation process.

6. The method of claim 1, wherein in step (3), the pressure of the dry pressing is 86000 to 96000 kN, and the molding specification is (1150 to 1300) mm*(2400 to 2600) mm*(3 to 6) mm.

7. The method of claim 1, wherein in step (3), the firing temperature is 1190 to 1220° C.

* * * * *